(12) United States Patent
Saito et al.

(10) Patent No.: US 10,035,916 B2
(45) Date of Patent: Jul. 31, 2018

(54) COMPOSITION FOR POWDER COATING MATERIAL, POWDER COATING MATERIAL, AND COATED ARTICLE

(71) Applicant: ASAHI GLASS COMPANY, LIMITED, Tokyo (JP)

(72) Inventors: Shun Saito, Tokyo (JP); Masataka Aikawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 15/247,260

(22) Filed: Aug. 25, 2016

(65) Prior Publication Data

US 2016/0362559 A1 Dec. 15, 2016

Related U.S. Application Data

(63) Continuation of application No. PCT/JP2015/068707, filed on Jun. 29, 2015.

(30) Foreign Application Priority Data

Jul. 1, 2014 (JP) ................................ 2014-136303
Jul. 1, 2014 (JP) ................................ 2014-136304

(51) Int. Cl.
```
C09D 5/03      (2006.01)
C23C 4/134     (2016.01)
C09D 127/16    (2006.01)
C09D 163/00    (2006.01)
C09D 167/00    (2006.01)
C09D 175/04    (2006.01)
C09D 183/00    (2006.01)
B05D 1/04      (2006.01)
C09D 133/12    (2006.01)
B05D 7/24      (2006.01)
B05B 5/025     (2006.01)
C23C 4/12      (2016.01)
C23C 28/00     (2006.01)
```

(52) U.S. Cl.
CPC .............. *C09D 5/03* (2013.01); *B05B 5/0255* (2013.01); *B05D 1/04* (2013.01); *B05D 7/24* (2013.01); *C09D 127/16* (2013.01); *C09D 133/12* (2013.01); *C09D 163/00* (2013.01); *C09D 167/00* (2013.01); *C09D 175/04* (2013.01); *C09D 183/00* (2013.01); *C23C 4/12* (2013.01); *C23C 4/134* (2016.01); *C23C 28/00* (2013.01)

(58) Field of Classification Search
None
See application file for complete search history.

(56) References Cited

U.S. PATENT DOCUMENTS

| | | | | |
|---|---|---|---|---|
| 4,027,066 A | * | 5/1977 | Victorius | C08G 59/4207 428/327 |
| 4,770,939 A | * | 9/1988 | Sietses | B05D 5/083 427/195 |
| 5,030,394 A | * | 7/1991 | Sietses | B29B 9/02 264/118 |
| 5,599,873 A | | 2/1997 | Verwey et al. | |
| 6,063,855 A | * | 5/2000 | Pecsok | C09D 127/16 524/501 |
| 6,362,271 B1 | * | 3/2002 | Lin | C09D 127/16 523/346 |
| 2006/0043343 A1 | * | 3/2006 | Chacko | B82Y 10/00 252/500 |
| 2012/0199250 A1 | * | 8/2012 | Zoboli | C23C 22/34 148/244 |

FOREIGN PATENT DOCUMENTS

| | | |
|---|---|---|
| GB | 2262100 | 6/1993 |
| JP | 9-165535 | 6/1997 |
| JP | 2006-297685 | 11/2006 |
| WO | WO01/25353 | 4/2001 |
| WO | WO2014/002964 | 1/2014 |
| WO | WO2015/016185 | 2/2015 |
| WO | WO2015/046262 | 4/2015 |

OTHER PUBLICATIONS

Werner Blank, Fox Equation for MMA/EMA copolymer at 60/40 and 90/10, retrieved Feb. 20, 2017, pp. 1-2.*
Werner Blank, Fox Equation for MMA/MA, MMA/EA and MMA/BA copolymers at 60/40 and 90/10, retrieved Jun. 1, 2017, pp. 1-6.*
English Abstract of FR 2636959, p. 1 (Year: 1990).*
International Search Report dated Aug. 11, 2015 in PCT/JP2015/068707 (with English Translation).
Decision to Grant a Patent application No. 2015-550109, dated Mar. 15, 2016 (with English Translation).

* cited by examiner

*Primary Examiner* — Callie Shosho
*Assistant Examiner* — Patrick N English
(74) *Attorney, Agent, or Firm* — Oblon, McClelland, Maier & Neustadt, L.L.P.

(57) ABSTRACT

To provide a composition for powder coating material which can be sufficiently pulverized, and with which a powder coating material capable of forming a coating film excellent in weather resistance and adhesion to the substrate can be obtained; a powder coating material capable of forming a coating film excellent in weather resistance and adhesion to the substrate; and a coated article having a coating film excellent in weather resistance and adhesion to the substrate, on its surface. A composition for powder coating material comprising a polyvinylidene fluoride (A) having a melting point of from 151 to 200° C., and an acrylic resin (B) having a glass transition temperature of from 40 to 90° C. A powder coating material comprising the composition for powder coating material, and a coated article having a coating film formed of the powder coating material.

15 Claims, No Drawings

COMPOSITION FOR POWDER COATING MATERIAL, POWDER COATING MATERIAL, AND COATED ARTICLE

TECHNICAL FIELD

The present invention relates to a composition for powder coating material, a powder coating material and a coated article.

BACKGROUND ART

In recent years, global scale environmental destruction problems such as global warming, ozone layer depletion, acid rain, etc. have gained prominent attention. Internationally, environmental pollution measures are advocated, and various regulations have been established from the viewpoint of environmental protection. Among them, release into the atmosphere of organic solvents (VOC) has been a serious problem, and also in each industry, the movement for de-organic solvents (de-VOC) along with the trend for strengthening VOC regulations has become active. Also in the paint industry, as a substitute for conventional organic solvent-based coating material, a powder coating material is highly expected as a coating material which contains no VOC and which is friendly to the environment as it can be recovered and reused without requiring exhaust treatment or wastewater treatment.

As such a powder coating material, an acrylic resin powder coating material, a polyester resin powder coating material or an epoxy resin powder coating material, is mainly used. However, coating films formed by using these powder coating materials have such a drawback that they are poor in weather resistance.

As a powder coating material which is excellent in weather resistance, a fluororesin-type powder coating material using a fluororesin has also been developed.

As the fluororesin-type powder coating material, for example, the following powder coating material has been proposed.

(1) A powder coating material obtained by dry blending a powder of a vinylidene fluoride copolymer having a melting point of at most 150° C., a crystallinity of at most 35% and a mass average molecular weight of from $1 \times 10^4$ to $5 \times 10^5$, and a powder of a methyl methacrylate copolymer having a glass transition temperature of at most 110° C. and a mass average molecular weight of from $1 \times 10^4$ to $5 \times 10^5$; or a powder coating material obtained by seed-polymerizing a monomer capable of forming the methyl methacrylate copolymer in an aqueous dispersion of the vinylidene fluoride copolymer, and spray drying the obtained aqueous dispersion (Patent Document 1).

As the methyl methacrylate copolymer in the powder coating material (1), a copolymer of methyl methacrylate and a monomer copolymerizable with methyl methacrylate such as n-butyl acrylate or t-butyl methacrylate may be used.

PRIOR ART DOCUMENT

Patent Document

Patent Document 1: JP-A-9-165535

DISCLOSURE OF INVENTION

Technical Problem

However, the powder coating material (1) may sometimes be hardly produced since the polymer cannot be sufficiently pulverized. Further, dispersibility of a pigment or the like tends to be poor, and the obtainable coating film may be poor in weather resistance. Further, the coating film formed of the powder coating material (1) may be insufficient in adhesion since the molten film is inferior in wettability to the substrate. Particularly, the adhesion of the coating film tends to be low to an aluminum substrate surface-treated with an environmentally friendly chemical conversion treatment agent containing no chromium(VI). Further, since the molten film has a high melt viscosity, bubble releasing tends to be poor, and the coating film may be inferior in the adhesion to the substrate.

It is an object of the present invention to provide a composition for powder coating material which can be sufficiently pulverized, and with which a powder coating material capable of forming a coating film excellent in weather resistance and adhesion to the substrate can be obtained; a powder coating material capable of forming a coating film excellent in weather resistance and adhesion to the substrate; and a coated article having a coating film excellent in weather resistance and adhesion to the substrate, on its surface.

Solution to Problem

The present invention provides a composition for powder coating material, a powder coating material and a coated article, having the following constructions [1] to [11].

[1] A composition for powder coating material comprising the following polyvinylidene fluoride (A) and the following acrylic resin (B):

polyvinylidene fluoride (A): a polyvinylidene fluoride having a melting point of from 151 to 200° C.;

acrylic resin (B): an acrylic resin having a glass transition temperature of from 40 to 90° C.

[2] The composition for powder coating material according to [1], wherein the acrylic resin (B) comprises units derived from methyl methacrylate and units derived from ethyl methacrylate, and the proportion of the units derived from methyl methacrylate to the units derived from ethyl methacrylate [(methyl methacrylate units)/(ethyl methacrylate units)] is from 50/50 to 90/10 (molar ratio).

[3] The composition for power coating material according to [1] or [2], wherein the difference between the melting point of the polyvinylidene fluoride (A) and the glass transition temperature of the acrylic resin (B) is from 65 to 150° C.

[4] The composition for powder coating material according to any one of [1] to [3], wherein the content of the polyvinylidene fluoride (A) is from 30 to 95 parts by mass in the total of 100 parts by mass of the polyvinylidene fluoride (A) and the acrylic resin (B).

[5] A powder coating material comprising a powder composed of the composition for powder coating material as defined in any one of [1] to [4].

[6] A powder coating material comprising a first powder composed of the composition for powder coating material as defined in any one of [1] to [4], and a second powder composed of a composition for powder coating material which contains at least one resin (C) selected from the group consisting of an acrylic resin, a polyester resin, an urethane resin, an epoxy resin and a silicone resin and which contains no fluororesin.

[7] The powder coating material according to [6], wherein the mixing ratio of the first powder to the second powder ((the first powder)/(the second powder)) is from 10/90 to 90/10 (mass ratio).

[8] A coated article having a coating film formed of the powder coating material as defined in any one of [5] to [7], on the surface of a substrate.

[9] The coated article according to [8], wherein the material for the substrate is aluminum or aluminum alloy surface-treated with a chemical conversion treatment agent.

[10] The coated article according to [9], wherein the chemical conversion treatment agent is a zirconium-type treatment agent or a titanium-type treatment agent, which does not contain chromium.

[11] The coated article according to [8], which further has, between the surface of the substrate and the coating film formed of the powder coating material, a primer layer composed of at least one primer selected from the group consisting of an acrylic resin, a polyester resin and an epoxy resin.

Advantageous Effects of Invention

According to the composition for powder coating material of the present invention, which can be sufficiently pulverized, it is possible to obtain a powder coating material capable of forming a coating film excellent in weather resistance and adhesion to the substrate.

According to the powder coating material of the present invention, it is possible to form a coating film excellent in weather resistance and adhesion to the substrate.

The coated article of the present invention has a coating film excellent in weather resistance and adhesion to the substrate, on its surface.

DESCRIPTION OF EMBODIMENTS

The following definitions of terms apply throughout the specification and claims.

A "fluororesin" is meant for a polymer compound having fluorine atoms in the molecule.

A "melting point" of a resin is meant for the temperature at the melting peak as measured by a differential scanning calorimetry (DSC) method.

A "glass transition temperature" of a resin is meant for the mid-point glass transition temperature measured by a differential scanning calorimetry (DSC) method.

A "dry blend" is meant for mixing two or more powders without melting the powders, and without addition of a solvent.

A "molten film" is meant for a film made of a melt of a powder coating material formed by applying the powder coating material.

A "coating film" is meant for a film formed by cooling a molten film and, in some cases, by curing.

A "unit" is meant for a moiety derived from a monomer, which is present in a polymer and which constitutes the polymer. Further, one having the structure of a certain unit chemically converted after polymer formation may also be referred to as a unit.

Hereinafter, as the case requires, units derived from an individual monomer may be called by a name having "units" attached to the monomer name.

[Composition for Powder Coating Material]

The composition for powder coating material of the present invention is a composition for powder coating material comprising polyvinylidene fluoride (A) (hereinafter referred to also as PVDF (A)) and an acrylic resin (B). The composition for powder coating material comprising polyvinylidene fluoride (A) and an acrylic resin (B) will be hereinafter referred to as "composition ($\alpha$)".

Composition ($\alpha$) may contain, as the case requires, a pigment, a curing agent, a curing catalyst and other components (hereinafter these may collectively be referred to as "additives").

By using composition ($\alpha$), it is possible to produce a first powder. The first powder may be used as it is, as the after-described powder coating material (I), or may be used for the after-described powder coating material (II) having the first powder and a second powder mixed.

Hereinafter, the first powder of the present invention may be referred to also as powder (X), and the second powder of the present invention may be referred to also as powder (Y).

(PVDF (A))

PVDF (A) is a homopolymer of vinylidene fluoride (hereinafter referred to also as VDF), or a copolymer comprising at least 80 mol % and less than 100 mol % of VDF units and more than 0 mol % and at most 20 mol % of units derived from monomer(s) other than VDF. If the proportion of units derived from monomer(s) other than VDF exceeds 20 mol %, weather resistance of the coating film will be insufficient. In a case where powder (X) is to be used as a thermosetting powder coating material, PVDF (A) may have a reactive group such as a carboxy group, a hydroxy group or a sulfo group, capable of reacting with a curing agent.

The monomer(s) other than VDF may, for example, be tetrafluoroethylene, trifluoroethylene, chlorotrifluoroethylene, hexafluoropropylene, perfluoro-butenoic acid, maleic acid, vinyl acetate, etc., and in view of weather resistance, tetrafluoroethylene, chlorotrifluoroethylene and hexafluoropropylene are preferred.

The melting point of PVDF (A) is from 151 to 200° C., particularly preferably from 152 to 190° C. When the melting point of PVDF (A) is at least the above lower limit value, composition ($\alpha$) can be pulverized at the time of forming powder (X) by pulverizing composition ($\alpha$). When the melting point of PVDF (A) is at most the upper limit value, the coating film will be excellent in adhesion to the substrate. Further, dispersibility of a pigment into composition ($\alpha$) will be excellent, and as a result, the coating film will be further excellent in weather resistance. Further, composition ($\alpha$) can be melt-kneaded at a low temperature, whereby it is possible to suppress deterioration of the acrylic resin (B). As a result, yellowing of the coating film can be suppressed, and the coating film will be excellent in appearance.

The number average molecular weight (Mn) of PVDF (A) is preferably from 50,000 to 400,000, particularly preferably from 100,000 to 300,000. When the number average molecular weight of PVDF (A) is within the above range, the coating film will be less likely to break, and adhesion of the coating film to the substrate will be excellent. As a result, the coating film will be further excellent in bending processability. When the number average molecular weight of PVDF (A) is at least the above lower limit value, it is easy to pulverize composition ($\alpha$) at the time of forming powder (X) by pulverizing composition ($\alpha$).

When the number average molecular weight of PVDF (A) is at most the upper limit value, composition ($\alpha$) can be melt-kneaded at a low temperature, whereby deterioration of the acrylic resin (B) can be suppressed. As a result, yellowing of the coating film can be suppressed, and the coating film will be excellent in appearance.

The mass average molecular weight (Mw) of PVDF (A) is preferably from 100,000 to 500,000, particularly preferably from 150,000 to 400,000. When the mass average molecular weight of PVDF (A) is within the above range, the coating film will be less likely to break, and adhesion of the coating film to the substrate will be excellent. As a result, the coating film will be further excellent in bending processability. When the mass average molecular weight of PVDF (A) is at least the above lower limit value, it is easy to pulverize composition (α) at the time of forming powder (X) by pulverizing composition (α). When the mass average molecular weight of PVDF (A) is at most the upper limit value, composition (α) can be melt-kneaded at a low temperature, whereby deterioration of the acrylic resin (B) can be suppressed. As a result, yellowing of the coating film can be suppressed, and the coating film will be excellent in appearance.

The molecular weight distribution (Mw/Mn) of PVDF (A) is preferably from 1 to 3, particularly preferably from 1.2 to 2.5. When the molecular weight distribution of PVDF (A) is within the above range, the melt viscosity of PVDF (A) can be adjusted to be low, whereby dispersibility of a pigment will be excellent at the time of preparation of composition (α) by melt-kneading as described hereinafter. When the number average molecular weight, the mass average molecular weight and the molecular weight distribution of PVDF (A) are within the above ranges, it is easy to adjust the melting point of PVDF (A) to be within the above range.

The melt viscosity of PVDF (A) is preferably from 1,000 to 5,000 Pa·s, particularly preferably from 1,500 to 4,000 Pa·s, at a kneading temperature of from 190 to 200° C. It is difficult to produce PVDF (A) having a melt viscosity lower than the above lower limit value. When the melt viscosity of PVDF (A) is at most the upper limit value, dispersibility of a pigment, adhesion to the substrate and smoothness of the coating film, will be excellent.

The melt viscosity of PVDF (A) is measured by using a rotary rheometer under a temperature-raising condition of 10° C./min.

The crystallinity of PVDF (A) is preferably from 10 to 35%, particularly preferably from 12 to 30%. When the crystallinity of PVDF (A) is at least the above lower limit value, the chemical resistance and heat resistance of the coating film will be excellent. When the crystallinity of PVDF (A) is at most the upper limit value, at the time of processing (e.g. bending, etc.) a coated article, it is possible to suppress color change (whitening) of the coating film at the processed portion.

For the crystallinity of PVDF (A), using EXSTAR DSC7020 (manufactured by SII Nano Technology Co., Ltd.), with respect to 10 mg of a sample, the heat balance is measured in a temperature range of from −25 to 200° C. at a temperature raising rate of 10° C./min and heat of fusion $M_1$ (J/g) is calculated from the area of the endothermic peak of the obtained chart and the amount of the sample, whereupon the crystallinity is calculated by the following formula (1) from $M_1$ and heat of fusion $M_2$ of perfect crystal of PVDF (literature value: 104.5 J/g, as disclosed in EXPRESS Polymer Letters, Vol. 4, No. 5, 2010, p. 284-291).

$$\text{Crystallinity (\%)} = (M_1/M_2) \times 100 \quad (1)$$

The difference between crystallinity during quenching and crystallinity during annealing (during annealing−during quenching) of PVDF (A) is preferably at most 3%, particularly preferably at most 2.5%. When the difference in crystallinity is at most the upper limit value, it is possible to form a coating film of the same appearance regardless of the conditions for cooling the molten film in actual coating.

For the crystallinity during quenching, a sample is completely dissolved at 300° C., then cooled from 300° C. to room temperature at a cooling rate of 10° C./min for re-crystallization, then by differential scanning calorimetry, 10 mg of the recrystallized sample is heated from room temperature to 200° C. at a temperature raising rate of 10° C./min, and heat of fusion $M_1$ (J/g) is calculated from the area of the endothermic peak of the obtained chart and the amount of the sample, whereupon the crystallinity during quenching is calculated by the above formula (1) from $M_1$ and heat of fusion $M_2$ of complete crystal of PVDF (literature value: 104.5 J/g, as disclosed in EXPRESS Polymer Letters, Vol. 4, No. 5, 2010, p. 284-291).

The crystallinity during annealing is calculated in the same manner as the crystallinity during quenching, except that the cooling rate as a re-crystallization condition is changed to 0.5° C./min.

PVDF (A) can be prepared by polymerizing VDF and optionally other monomers, by a known polymerization method. As the polymerization method, an emulsion polymerization method or a suspension polymerization method may, for example, be mentioned.

(Acrylic Resin (B))

The acrylic resin (B) is a polymer having units derived from an acrylate or methacrylate. In a case where powder (X) is to be used as a thermosetting powder coating material, the acrylic resin (B) may have a reactive group capable of reacting with a curing agent, such as a carboxy group, a hydroxy group or a sulfo group.

The acrylic resin (B) is preferably a methyl methacrylate copolymer comprising units derived from methyl methacrylate (hereinafter referred to also as MMA) and units derived from a monomer other than MMA, since the glass transition temperature can thereby be easily adjusted to be within the range which will be described later.

The monomer other than MMA may, for example, be an alkyl acrylate, an alkyl methacrylate (excluding methyl methacrylate), a hydroxyalkyl acrylate, a hydroxyalkyl methacrylate, acrylic acid, methacrylic acid, acrylamide, methacrylamide, glycidyl methacrylate, glycidyl acrylate or 3-trimethoxysilylpropyl methacrylate, and from the viewpoint of dispersibility of a pigment, adhesion to the substrate, and easy pulverization of composition (α), ethyl methacrylate (hereinafter referred to also as EMA) is preferred.

The acrylic resin (B) is particularly preferably a polymer comprising MMA units and EMA units.

The proportion of the MMA units to the EMA units (MMA units/EMA units) is preferably from 50/50 to 90/10 (molar ratio), more preferably from 55/45 to 85/15 (molar ratio), particularly preferably from 60/40 to 80/20 (molar ratio). When the proportion (MMA units/EMA units) is at least the lower limit value, the acrylic resin (B) hardly has a too low glass transition temperature, and composition (α) tends to be more readily be pulverized. When the proportion (MMA units/EMA units) is at most the upper limit value, the acrylic resin (B) hardly has a too high glass transition temperature, and the molten film will be excellent in wettability to the substrate, and as a result, a coating film excellent in adhesion tends to be formed.

The glass transition temperature of the acrylic resin (B) is from 40 to 90° C., preferably from 45 to 80° C. When the glass transition temperature of the acrylic resin (B) is at least the lower limit value, it is possible to pulverize composition (α) at the time of forming a powder by pulverizing composition (α). Further, stickiness is less at the time of melt-kneading the composition. Further, blocking of the powder can be suppressed. When the glass transition temperature of the acrylic resin (B) is at most the above upper limit value, the molten film will be excellent in wettability to the substrate, and as a result, the coating film will be excellent in adhesion to the substrate. Further, the melt viscosity of the composition during melt-kneading will be low, whereby dispersibility of a pigment in composition (α) will be excellent, and as a result, the coating film will be further excellent in weather resistance. Further, the melt viscosity of the molten film at the time of coating is lowered, whereby bubble releasing is facilitated, and the coating film will be excellent in adhesion to the substrate.

The difference between the melting point of PVDF (A) and the glass transition temperature of the acrylic resin (B) is preferably from 65 to 150° C., particularly preferably from 70 to 140° C. When the difference between the melting point of PVDF (A) and the glass transition temperature of the acrylic resin (B) is at least the above lower limit value, it is easy to pulverize composition (α) at the time of forming a powder by pulverizing composition (α). Further, stickiness is less at the time of melt-kneading composition (α). Further, blocking of the powder can be suppressed. When the difference between the melting point of PVDF (A) and the glass transition temperature of the acrylic resin (B) is at most the upper limit value, dispersibility of a pigment into composition (α) will be excellent. Further, the melt viscosity of the molten film at the time of coating will be low, whereby bubble releasing will be facilitated, and the coating film will be excellent in adhesion to the substrate.

The number average molecular weight (Mn) of the acrylic resin (B) is preferably from 20,000 to 100,000, particularly preferably from 30,000 to 90,000. When the number average molecular weight of the acrylic resin (B) is at least the above lower limit value, it is easy to pulverize the composition at the time of forming a powder by pulverizing the composition. Further, stickiness is less at the time of melt-kneading the composition. Further, blocking of the powder can be suppressed. When the number average molecular weight of the acrylic resin (B) is at most the upper limit value, the molten film will be excellent in wettability to the substrate, and as a result, the coating film will be excellent in adhesion to the substrate. Further, the melt viscosity of the composition at the time of melt-kneading will be low, whereby dispersibility of a pigment in the composition will be excellent, and as a result, the coating film will be further excellent in weather resistance. Further, the melt viscosity of the molten film will be low at the time of coating, whereby bubble releasing will be facilitated, and the coating film will be excellent in adhesion to the substrate.

The mass average molecular weight (Mw) of the acrylic resin (B) is preferably from 30,000 to 200,000, particularly preferably from 40,000 to 150,000. When the mass average molecular weight of the acrylic resin (B) is at least the above lower limit value, it is easy to pulverize the composition at the time of forming a powder by pulverizing the composition. Further, stickiness is less at the time of melt-kneading the composition. Further, blocking of the powder can be suppressed. When the mass average molecular weight of the acrylic resin (B) is at most the upper limit value, the molten film will be excellent in wettability to the substrate, and as a result, the coating film will be excellent in adhesion to the substrate. Further, the melt viscosity of the composition at the time of melt-kneading will be low, whereby dispersibility of a pigment in the composition will be excellent, and as a result, the coating film will be further excellent in weather resistance. Further, the melt viscosity of the molten film will be low at the time of coating, whereby bubble releasing will be facilitated, and the coating film will be excellent in adhesion to the substrate.

The molecular weight distribution (Mw/Mn) of the acrylic resin (B) is preferably from 1 to 4, particularly preferably from 1.2 to 3. When the molecular weight distribution of the acrylic resin (B) is within the above range, the melt viscosity at from 110 to 210° C. becomes low, whereby dispersibility of a pigment, adhesion to the substrate and smoothness of the coating film will be excellent. Further, when the number average molecular weight, the mass average molecular weight and the molecular weight distribution of the acrylic resin are within the above ranges, it is easy to adjust the glass transition temperature of the acrylic resin to be within the above range.

The melt viscosity of the acrylic resin (B) is preferably from 10 to 1,000 Pa·s, particularly preferably from 50 to 500 Pa·s at a kneading temperature of from 190 to 200° C. When the melt viscosity of the acrylic resin (B) is less than the lower limit value, the difference from the melt viscosity of PVDF (A) becomes too large, and melt kneading with PVDF (A) tends to be insufficient. When the melt viscosity of the acrylic resin (B) is at most the upper limit value, it covers the high melt viscosity of PVDF (A) and sufficiently lowers the melt viscosity of the entire composition for powder coating material, whereby dispersibilty of a pigment, adhesion to the substrate and smoothness of the coating film will be excellent.

The melt viscosity of the acrylic resin (B) is measured by using a rotary rheometer under a temperature raising rate of 10° C./min.

(Pigment)

As the pigment, at least one member selected from the group consisting of a luster pigment, an anticorrosive pigment, a coloring pigment and an extender pigment is preferred.

A luster pigment is a pigment to present a luster to the coating film. As the luster pigment, aluminum powder, nickel powder, stainless steel powder, copper powder, bronze powder, gold powder, silver powder, mica powder, graphite powder, glass flakes, a scale-like iron oxide powder or the like, may be mentioned.

An anticorrosive pigment is a pigment for a substrate which requires corrosion resistance i.e. to prevent corrosion or deterioration of the substrate. As the anticorrosive pigment, a lead-free anticorrosive pigment presenting little impact on the environment is preferred. As the lead-free anticorrosive pigment, zinc cyanamide, zinc oxide, zinc phosphate, calcium magnesium phosphate, zinc molybdate, barium borate or zinc calcium cyanamide, may, for example, be mentioned.

A coloring pigment is a pigment to color the coating film. As the coloring pigment, titanium oxide, carbon black, iron oxide, phthalocyanine blue, phthalocyanine green, quinacridone, isoindolinone, benzimidazolone, a dioxazine, etc. may be mentioned.

An extender pigment is a pigment to improve hardness of the coating film and to increase the thickness of the coating film. Further, it is preferably incorporated, since it is possible to make the cut surface of the coating film clean, when the substrate is cut. The extender pigment may, for example, be talc, barium sulfate, mica, calcium carbonate, etc.

The titanium oxide is preferably one having surface treatment applied so that a photocatalytic reaction is less likely to proceed, and specifically, it is preferably titanium oxide surface-treated with e.g. silica, alumina, zirconia, selenium or an organic component (polyol), particularly preferably titanium oxide having the titanium oxide content adjusted to be from 83 to 90 mass % by such surface treatment. When the content of titanium oxide is at least the above lower limit value, the coating film will be excellent in whiteness. When the content of titanium oxide is at most the above upper limit value, the coating film is less likely to deteriorate.

As commercial products of such titanium oxide, "Tipaque (trade name) PFC105" (titanium oxide content: 87 mass %) and "Tipaque (trade name) CR95" (titanium oxide content: 90 mass %), manufactured by Ishihara Sangyo Kaisha, Ltd., "D918" (titanium oxide content: 85 mass %), manufactured by Sakai Chemical Industry Co., Ltd. "Ti-Pure (trade name) R960" (titanium oxide content: 89 mass %) and "Ti-Select (trade name)" (titanium oxide content: 90 mass %), manufactured by DuPont, etc. may be mentioned.

(Curing Agent)

In a case where powder (X) is to be used as a thermosetting powder coating material, composition (α) may contain a curing agent.

The curing agent is a compound to cure a resin by reacting with a reactive group of the resin (PVDF (A), acrylic resin (B), etc.) to cross-link the resin or to increase the molecular weight of the resin. The curing agent has at least two reactive groups capable of reacting with a reactive group (a hydroxy group, a carboxy group, etc.) of the resin. As the reactive groups of the curing agent, ones reactive with a reactive group of the resin at ordinary temperature are undesirable, and therefore, they are preferably reactive groups capable of reacting at the time when the powder coating material is heated and melted. For example, blocked isocyanate groups are preferred to isocyanate groups having high reactivity at ordinary temperature. When the powder coating material is heated and melted, blocked isocyanate groups become isocyanate groups, as the blocking agent is detached, and the isocyanate groups act as reactive groups.

As the curing agent, it is possible to use a known compound, for example, a blocked isocyanate-type curing agent, an amine-type curing agent (melamine resin, guanamine resin, sulfonamide resin, urea resin, aniline resin, etc.), a β-hydroxyalkyl amide-type curing agent, or a triglycidyl isocyanurate-type curing agent. A blocked isocyanate-type curing agent is particularly preferred, since adhesion to the substrate, processability of the product after coating, and water resistance of the coating film, will be excellent.

Curing agents may be used alone, or may be used in combination of two or more of them.

The softening temperature of the curing agent is preferably from 10 to 120° C., particularly preferably from 40 to 100° C. When the softening temperature is at least the above lower limit value, the powder coating material is hardly curable at room temperature, and particulate agglomerates are less likely to be formed. When the softening temperature is at most the above upper limit value, it is easy to uniformly disperse the curing agent in the powder at the time of forming the powder by melt-kneading the composition, and the resulting coating film will be excellent in surface smoothness, strength and moisture resistance.

The blocked isocyanate-type curing agent is preferably a solid one at room temperature.

The blocked isocyanate-type curing agent is preferably one produced by reacting a polyisocyanate obtained by reacting an aliphatic, aromatic or araliphatic diisocyanate with a low molecular weight compound having active hydrogen, with a blocking agent for masking.

As the diisocyanate, tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl)cyclohexane, isophorone diisocyanate, dimer acid diisocyanate, lysine diisocyanate, etc., may be mentioned.

As the low molecular weight compound having active hydrogen, water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester containing hydroxy groups, polycaprolactone, etc., may be mentioned.

As the blocking agent, alcohols (methanol, ethanol, benzyl alcohol, etc.), phenols (phenol, cresol etc.), lactams (caprolactam, butyrolactam, etc.), oximes (cyclohexanone, oxime, methyl ethyl ketoxime, etc.), etc. may be mentioned.

(Curing Catalyst)

In a case where powder (X) is to be used as a thermosetting powder coating material, composition (α) may contain a curing catalyst.

The curing catalyst is one to accelerate the curing reaction and to impart excellent chemical properties and physical properties to the coating film.

In the case of using a blocked isocyanate-type curing agent, a curing catalyst is preferably a tin catalyst (stannous octoate, tributyltin laurate, dibutyltin dilaurate, etc.).

Curing catalysts may be used alone, or in combination of two or more of them.

(Other Components)

Composition (α) may, as the case requires, further contain additives other than a pigment, a curing agent and a curing catalyst (hereinafter referred to as other additives).

Other additives may, for example, be a ultraviolet absorber, a light stabilizer, a matting agent (ultrafine synthetic silica, etc.), a surfactant (a nonionic surfactant, a cationic surfactant, or an anionic surfactant), a leveling agent, a surface modifier (to improve the surface smoothness of the coating film), a degassing agent (having a function to discharge air included in the powder, a blocking agent discharged from a curing agent, moisture, etc. out of the molten film, so that they will not stay in the coating film, and it is normally solid, but when melted, it becomes to have very low viscosity), a filler, a heat stabilizer, a thickener, a dispersing agent, an antistatic agent, a rust inhibitor, a silane coupling agent, an antifouling agent, a low-staining agent, etc.

(Contents of Respective Components in Composition (α))

The content of PVDF (A) in composition (α) is preferably from 30 to 95 parts by mass, more preferably from 35 to 90 mass %, particularly preferably from 40 to 85 mass %, in the total of 100 parts by mass of PVDF (A) and the resin (B). When the content of PVDF (A) is at least the lower limit value, the coating film will be further excellent in weather resistance. When the content of PVDF (A) is at most the upper limit value, the coating film will be further excellent in bending processability.

Resin components contained in composition (α) preferably consist solely of PVDF (A) and the acrylic resin (B), i.e. composition (α) preferably does not contain other resins other than PVDF (A) and the acrylic resin (B). When composition (α) does not contain other resins, the coating film will be further excellent in weather resistance and adhesion.

In a case where composition (α) contains a pigment, the content of the pigment in composition (α) is preferably from 20 to 200 parts by mass, particularly preferably from 50 to 150 parts by mass, to 100 parts by mass of the resin components contained in composition (α).

In a case where composition (α) contains a curing agent, the content of the curing agent (E) in composition (α) is preferably from 1 to 50 parts by mass, particularly preferably from 3 to 30 parts by mass, to 100 parts by mass of the resin components contained in composition (α).

In a case where the curing agent is a blocked isocyanate-type curing agent, the content of the blocked isocyanate-type curing agent in composition (α) is preferably such an amount that the molar ratio of isocyanate groups to the hydroxy groups in composition (α) will be from 0.05 to 1.5, particularly preferably from 0.8 to 1.2. When the molar ratio is at least the lower limit value in the above range, the curing degree of the powder coating material becomes high, and adhesion of the coating film to the substrate, hardness and chemical resistance of the coating film, etc. will be excellent. When the molar ratio is at most the upper limit value in the above range, the coating film is less likely to become brittle, and yet, the coating film will be excellent in heat resistance, chemical resistance, moisture resistance, etc.

In a case where composition (α) contains a curing catalyst, the content of the curing catalyst in composition (α) is preferably from 0.0001 to 10 parts by mass to 100 parts by mass in total of solid contents in composition (α) other than a pigment. When the content of the curing catalyst is at least the above lower limit value, catalytic effects tend to be sufficiently obtained. When the content of the curing catalyst is at most the upper limit value, a gas such as air that has been included in the powder coating material at the time of applying the powder coating material, can readily be released, whereby deterioration in heat resistance, weather resistance and water resistance of the coating film caused by the remaining gas will be less.

In a case where composition (α) contains other additives, the total content of other additives in composition (α) is preferably at most 45 mass %, particularly preferably at most 30 mass %, in composition (α) (100 mass %).

(Mechanism of Effects)

The above-described composition for powder coating material (composition (α)) of the present invention, which comprises PVDF (A) having a melting point controlled to be within a specific range and an acrylic resin (B) having a glass transition temperature controlled to be within a specific range in combination, can be sufficiently pulverized when formed into a powder coating material, and with such a composition, a powder coating material capable of forming a coating film excellent in weather resistance and adhesion can be obtained.

Further, when PVDF (A) is combined with an acrylic resin (B) comprising MMA units and EMA units in a specific proportion, it is possible to obtain a powder coating material capable of forming a molten film further excellent in wettability and thus a coating film further excellent in adhesion. Particularly, it is possible to obtain a powder coating material capable of forming a molten film excellent in wettability even to an aluminum substrate surface-treated with a chemical conversion treatment agent containing no chromium(VI) and thus a coating film excellent in adhesion to such a substrate.

[Powder Coating Material]

The powder coating material of the present invention may be classified into the following powder coating material (I) and powder coating material (II).

Powder coating material (I): comprises a first powder (powder (X)) composed of the composition for powder coating material of the present invention (composition (α)).

Powder coating material (II): comprises a first powder (powder (X)) composed of the composition for powder coating material of the present invention (composition (α)) and a second powder (powder (Y)) composed of a composition for powder coating material containing at least one resin (C) selected from the group consisting of an acrylic resin, a polyester resin, an urethane resin, an epoxy resin and a silicone resin and containing no fluororesin.

Here, the "composition for powder coating material containing the resin (C) and containing no fluororesin" will be hereinafter referred to as "composition (β)".

Now, each of powder coating material (I) and powder coating material (II) will be described.

[Powder Coating Material (I)]

Powder coating material (I) comprises at least one type of powder (X).

The content of powder (X) in powder coating material (I) is preferably from 50 to 100 mass %, more preferably from 70 to 100 mass %, further preferably from 80 to 100 mass %, particularly preferably from 90 to 100 mass %. Powder coating material (I) may be a coating material composed solely of powder (X).

(Method for Producing Powder Coating Material (I))

Powder coating material (I) may be produced, for example, by a production method comprising the following step (a), step (b) and step (c).

(a) A step of melt-kneading a mixture comprising PVDF (A) and the acrylic resin (B), which may, as a case requires, contain the above-mentioned additives, to obtain a kneaded material composed of composition (α).

(b) A step of pulverizing the kneaded material composed of composition (α) to obtain powder (X).

(c) As the case requires, a step of conducting classification of powder (X).

<Step (a)>

The respective components are mixed to obtain a mixture, and then, the mixture is melt-kneaded to obtain a kneaded product wherein the components are homogenized.

Each component is preferably preliminarily pulverized in a powder form.

The apparatus to be used for mixing may, for example, be a high speed mixer, a V type mixer or a reversing mixer.

The apparatus to be used for melt-kneading may, for example, be a single screw extruder, a twin-screw extruder or a planetary gear.

A kneaded product is preferably pelletized after being cooled.

<Step (b)>

The apparatus to be used for pulverization may, for example, be a pulverizer such as a pin mill, a hammer mill or a jet mill.

<Step (c)>

In order to remove a powder with a particle size being too small or too large, it is preferred to conduct classification after pulverization. When classification is to be conducted, it is preferred to remove at least either particles with a particle size of less than 10 μm or particles with a particle size exceeding 100 μm.

The classification method may, for example, be a method by sieving or an air classification method.

The average particle size of powder (X) may, for example, be preferably from 15 to 50 μm, in a 50% average volume particle size distribution. Measurement of the particle size of the powder is usually carried out by using a particle size measuring instrument of a type to capture the potential change at the time of passing through a pore, of a laser diffraction system, of an image determination type or of a sedimentation rate measuring system.

(Mechanism of Effects)

The above-described powder coating material (I) contains a powder composed of the composition for powder coating material of the present invention (composition (α)), whereby it is possible to form a coating film excellent in weather resistance and adhesion to the substrate.

[Powder Coating Material (II)]

Powder coating material (II) comprises at least one type of powder (X) and at least one type of the following powder (Y).

Powder (Y): A powder composed of composition (β). Composition (β) may contain additives as the case requires.

The total content of powder (X) and powder (Y) in powder coating material (II) is preferably from 50 to 100 mass %, more preferably from 70 to 100 mass %, further preferably from 80 to 100 mass %, particularly preferably from 90 to 100 mass %. Powder coating material (II) may be a coating material composed solely of powder (X) and powder (Y).

The mixing ratio of powder (X) to powder (Y) (powder (X)/powder (Y)) in powder coating material (II) is preferably from 10/90 to 90/10 (mass ratio), more preferably from 20/80 to 80/20 (mass ratio), particularly preferably from 25/75 to 75/25 (mass ratio). When the proportion of powder (X) is at least the above lower limit value, the weather resistance of the coating film will be further excellent. When the proportion of powder (Y) is at least the above lower limit value, it is possible to reduce the cost for the coating film.

(Resin (C))

Resin (C) is at least one member selected from the group consisting of an acrylic resin, a polyester resin, an urethane resin, an epoxy resin and a silicone resin.

<Acrylic Resin>

As an acrylic resin, one similar to the acrylic resin (B) exemplified for composition (α) may be mentioned, and the same applies to preferred embodiments.

<Polyester Resin>

The polyester resin may be one having units derived from a polycarboxylic acid compound and units derived from a polyhydric alcohol compound, and if necessary, having units other than these two types of units (for example, units derived from a hydroxy carboxylic acid compound).

The polycarboxylic acid compound may, for example, be phthalic acid, isophthalic acid, terephthalic acid, naphthalene dicarboxylic acid, trimellitic acid, pyromellitic acid, phthalic anhydride, or the like, and isophthalic acid is preferred, since the cured film will be excellent in weather resistance.

The polyhydric alcohol compound is preferably an aliphatic polyhydric alcohol or an alicyclic polyhydric alcohol, more preferably an aliphatic polyhydric alcohol, from the viewpoint of excellent adhesion to the substrate and flexibility of the cured film.

As the polyhydric alcohol compound, ethylene glycol, diethylene glycol, triethylene glycol, 1,2-propanediol, 1,3-propanediol, 1,3-butanediol, 1,4-butanediol, 1,2-pentanediol, 1,5-pentanediol, neopentyl glycol, spiro glycol, 1,10-decanediol, 1,4-cyclohexanedimethanol, trimethylolethane, trimethylolpropane, glycerol or pentaerythritol may, for example, be mentioned.

As the polyhydric alcohol, neopentyl glycol, 1,2-pentanediol, 1,5-pentanediol, or trimethylolpropane, is preferred, and in view of easy availability, neopentyl glycol or trimethylolpropane, is particularly preferred.

As commercial products of the polyester resin, "CRYLCOAT (trade name) 4642-3" and "CRYLCOAT (trade name) 4890-0", manufactured by DAICEL-ALLNEX LTD., and "GV-250", "GV-740" and "GV-175", manufactured by Japan U-Pica Company Ltd. may, for example, be mentioned.

<Urethane Resin>

As the urethane resin, a mixture obtained by mixing, or a resin obtained by reacting, a polyol (such as acrylic polyol, polyester polyol, polyether polyol or polyhydric alcohol) with an isocyanate compound, may be mentioned. It is preferred to employ a powder coating material comprising a powdered polyol (such as acrylic polyol, polyester polyol or polyether polyol) and a powdered isocyanate compound or blocked isocyanate compound.

<Epoxy Resin>

The epoxy resin may, for example, be a bisphenol A-type epoxy resin, a bisphenol F-type epoxy resin, or a 1,2-epoxy-4-(2-oxiranyl)cyclohexane adduct of 2,2-bis(hydroxymethyl)-1-butanol.

As commercial products of the epoxy resin, "Epikote (trade name) 1001", "Epikote (trade name) 1002" and "Epikote (trade name) 4004P", manufactured by Mitsubishi Chemical Corporation, "Epiclon (trade name) 1050" and "Epiclon (trade name) 3050", manufactured by DIC Corporation, "EPOTOHTO (trade name) YD-012" and "EPOTOHTO (trade name) YD-014", manufactured by NIPPON STEEL & SUMIKIN CHEMICAL CO., LTD., "Denacol (trade name) EX-711", manufactured by Nagase ChemteX Corporation, and "EHPE3150", manufactured by Daicel Chemical Industries, Ltd. may, for example, be mentioned.

<Silicone Resin>

The silicone resin may be one which has a branched structure, has a silanol group (Si—OH) as a reactive group, is curable by dehydration condensation with each other, and is capable of forming, after curing, a coating film of a three-dimensional crosslinked structure. Otherwise, a silicone resin with a relatively low molecular weight (modified silicone resin intermediate) and another thermosetting resin (such as an alkyd resin, a polyester resin, an epoxy resin or an acrylic resin) may be used in combination.

Commercial products of the silicone resin may, for example, be "GLASCA HPC-7506", manufactured by JSR Corporation, "Gemlac (trade name)", manufactured by Kaneka Corporation, "SILIKOPON (trade name) EF", "SILIKOPON (trade name) EW", "SILIKOPON (trade name) EC" and "SILIKOPON (trade name) ED" manufactured by Evonik.

(Additives)

As the additives, ones similar to those exemplified for composition (α) may be mentioned, and the same applies to preferred embodiments.

(Contents of Respective Components in Composition (β))

The content of the resin (C) in composition (β) is preferably from 20 to 85 mass %, more preferably from 30 to 80 mass %, particularly preferably from 40 to 75 mass %, in composition (β) (100 mass %).

In a case where composition (β) contains a curing agent, the content of the curing agent in composition (β) is preferably from 1 to 50 parts by mass, particularly preferably from 3 to 30 parts by mass, to 100 parts by mass of the resin components contained in composition (β).

In a case where the curing agent is a blocked isocyanate-type curing agent, the content of the blocked isocyanate-type curing agent in composition (β) is preferably such an amount that the molar ratio of isocyanate groups to hydroxy groups in composition (β) will be from 0.05 to 1.5, particularly preferably from 0.8 to 1.2. When the molar ratio is at least the lower limit value in the above range, the curing degree of the powder coating material becomes high, and adhesion of the coating film to the substrate, hardness and chemical resistance of the coating film, etc. will be excellent. When the molar ratio is at most the upper limit value in the above range, the coating film is less likely to be brittle, and yet, heat resistance, chemical resistance, moisture resistance, etc. of the coating film, will be excellent.

In a case where composition (β) contains a curing catalyst, the content of the curing catalyst in composition (β) is preferably from 0.0001 to 10 parts by mass to 100 parts by mass in total of solid contents in composition (β) other than a pigment. When the content of the curing catalyst is at least the above lower limit value, catalytic effects tend to be sufficiently obtained. When the content of the curing catalyst is at most the upper limit value, a gas such as air that has been included in the powder coating material at the time of applying the powder coating material, can be readily released, whereby deterioration in heat resistance, weather resistance and water resistance of the coating film to be caused by the remaining gas, is less likely.

When composition (β) contains other additives, the total content of other additives in composition (β) is preferably at most 45 mass %, particularly preferably at most 30 mass %, in composition (β) (100 mass %).

(Contents of Respective Components in Entire Powder Coating Material (II))

The total content of the acrylic resin (B) in composition (α) and the resin (C) in composition (β), is preferably from 10 to 90 parts by mass, more preferably from 20 to 80 parts by mass, particularly preferably from 25 to 75 parts by mass, to 100 parts by mass in total of PVDF (A) and the acrylic resin (B) in composition (α) and the resin (C) in composition (β). When the total content of the acrylic resin (B) and the resin (C) is at least the above lower limit value, it is possible to reduce the cost for the coating film. When the total content of the acrylic resin (B) and the resin (C) is at most the upper limit value, the weather resistance of the coating film will be further excellent.

The total content of a pigment in composition (α) and a pigment in composition (β) is preferably from 20 to 200 parts by mass, particularly preferably from 50 to 150 parts by mass, to 100 parts by mass of the resin components contained in composition (α) and composition (β).

(Method for Producing Powder Coating Material (II))

Powder coating material (II) may, for example, be produced by a production method having the following steps (a) to (g).

(a) A step of melt-kneading a mixture comprising PVDF (A) and the acrylic resin (B), which may, as the case requires, contain additives, to obtain a kneaded product composed of composition (α).

(b) A step of pulverizing the kneaded product composed of composition (α) to obtain powder (X).

(c) As the case requires, a step of conducting classification of powder (X).

(d) A step of melt-kneading a mixture comprising the resin (C) and not containing a fluororesin, which may, as the case requires, contain additives, to obtain a kneaded product composed of composition (β).

(e) A step of pulverizing the kneaded product composed of composition (β) to obtain powder (Y).

(f) As the case requires, a step of conducting classification of powder (Y).

(g) A step of dry-blending powder (X) and powder (Y).

<Step (a), (d)>

The respective components are mixed to prepare a mixture, and then, the mixture is melt-kneaded to obtain a kneaded product wherein the respective components are homogenized.

Each component is preferably preliminarily pulverized in a powder form.

The apparatus to be used for mixing may, for example, be a high speed mixer, a V type mixer or a reversing mixer.

The apparatus to be used for melt-kneading may, for example, be a single screw extruder, a twin-screw extruder or a planetary gear.

The kneaded product is preferably pelletized after cooling.

<Step (b), (e)>

The apparatus to be used for pulverization may, for example, be a pulverizer such as a pin mill, a hammer mill or a jet mill.

<Step (c), (f)>

In order to remove a powder with a particle size being too small or too large, it is preferred to conduct classification after pulverization. In the case of conducting such classification, it is preferred to remove at least either particles with a particle size of less than 10 μm or particles with a particle size exceeding 100 μm.

The classification method may, for example, be a method by sieving or an air classification method.

The average particle size of powder (X) and powder (Y) is, for example, preferably from 15 to 50 μm in a 50% average volume particle size distribution. Measurement of the particle size of the powder is usually carried out by using a particle size measuring instrument e.g. of a type to capture the potential change at the time of passing through a pore, of a laser diffraction system, of an image determination type, or of a sedimentation rate measuring system.

<Step (g)>

The apparatus to be used for dry blending may, for example, be a high-speed mixer, a double cone mixer, a kneader, a tumbler mixer, a mixing shaker, a drum shaker or a rocking shaker.

The mixing ratio of powder (X) to powder (Y) (powder (X)/powder (Y)) is preferably from 10/90 to 90/10 (mass ratio), more preferably from 20/80 to 80/20 (mass ratio), particularly preferably from 25/75 to 75/25 (mass ratio). When the proportion of powder (X) is at least the above lower limit value, the weather resistance of the coating film will be further excellent. When the proportion of powder (Y) is at least the above lower limit value, it is possible to reduce the cost for the coating film.

(Mechanism of Effects)

The above-described powder coating material (II) contains powder (X) and powder (Y), whereby it is possible to form a coating film excellent in weather resistance and adhesion to the substrate.

[Coated Article]

The coated article of the present invention has, on the surface of a substrate, a coating film formed of powder coating material (I) or powder coating material (II) (hereinafter powder coating material (I) and powder coating material (II) may collectively be referred to as the powder coating material).

To increase adhesion between the substrate and the coating film, a primer layer comprising a primer may be provided between the substrate and the coating film.

As the primer, at least one resin selected from the group consisting of an acrylic resin, a polyester resin and an epoxy resin may suitably be used.

The thickness of the primer layer is preferably from 1 to 60 μm, more preferably from 5 to 40 μm.

(Substrate)

The material for the substrate is preferably a metal such as aluminum, iron or magnesium, and aluminum or an aluminum alloy is more preferred, since it is excellent in corrosion resistance and light in weight and has excellent properties for use as building material. The aluminum alloy may, for example, be an alloy of aluminum with at least one member selected from the group consisting of copper, manganese, silicon, magnesium, zinc and nickel.

The shape, size, etc. of the substrate are not particularly limited.

The aluminum or aluminum alloy may have a coating film on its surface or may be surface-treated with a chemical conversion treatment agent, and it is particularly preferably surface-treated with a chemical conversion treatment agent, whereby adhesion between the substrate and the coating film formed from the powder coating material will be excellent.

The chemical conversion treatment agent may, for example, be a hexavalent chromium-type treatment agent, a trivalent chromium-type treatment agent, a zirconium-type treatment agent or a titanium-type treatment agent. From the point of concern for the environment, a zirconium-type treatment agent or a titanium-type treatment agent is preferred.

Specifically, as the zirconium-type treatment agent, "Chemibonder (trade name) 5507, 5703, 5705, 5706", manufactured by The Japan Cee-Bee Chemical Co., Ltd., "PALCOAT 3762, 3796, 20X", manufactured by Nihon Parkerizing Co., Ltd. "Alodine (trade name) 5200, 4707", manufactured by Henkel, "ALSURF (trade name) 320, 375", manufactured by NIPPONPAINT Co., Ltd., "E-CLPS (trade name) 1700, 1900", manufactured by Bulk Chemical Co., Ltd., etc., may be mentioned, and as the titanium-type treatment agent, "ALSURF (trade name) CX4707", manufactured by NIPPONPAINT Co., Ltd., "E-CLPS (trade name) 2100, 2900", manufactured by Bulk Chemical Co., Ltd., etc. may be mentioned.

(Method for Producing Coated Article)

The coated article of the present invention can be produced by a production method having the following step (h) and step (i).

(h) A step of applying the powder coating material on a substrate to form a molten film made from a melt of the powder coating material.

(i) A step of cooling the molten film to form a coating film.

<Step (h)>

The powder coating material is applied on a substrate to form a molten film made from a melt of the powder coating material on the substrate.

The molten film made from a melt of the powder coating material may be formed at the same time as the application of the powder coating material on the substrate, or may be formed by depositing a powder of the powder coating material on a substrate and then heating and melting the powder on the substrate. In a case where the powder coating material is thermosetting, almost at the same time as the powder coating material is heated and melted, the curing reaction of reactive components in the composition will start, and therefore, it is necessary to conduct the heating and melting of the powder coating material, and the deposition on the substrate, almost at the same time, or to conduct the heating and melting of the powder coating material after depositing the powder coating material on the substrate.

In a case where a primer layer is to be provided, the primer layer and the molten film made from a melt of the powder coating material, may be formed by depositing, on a substrate, at least one primer selected from the group consisting of an acrylic resin, a polyester resin and an epoxy resin, and then, depositing a powder of the powder coating material, followed by heating and melting. Otherwise, they may be formed by depositing the primer on the substrate, followed by heating and melting, and then, depositing a powder of the powder coating material, followed by heating and melting again.

The heating temperature (hereinafter referred to also as the baking temperature) and the heating retention time (hereinafter referred to as the baking time) to heat and melt the powder coating material and to maintain the molten state for a predetermined time, are suitably set depending upon the types and composition of raw material components of the powder coating material, the desired thickness of the coating film, etc. In a case where the powder coating material is thermoplastic, the baking temperature is preferably from 200 to 300° C. The baking time is preferably from 5 to 180 minutes. In a case where the powder coating material is thermosetting, the baking temperature is preferably set depending on the reaction temperature of the curing agent. For example, in the case of using a blocked polyisocyanate-type curing agent as the curing agent, the baking temperature is preferably from 170 to 210° C. The baking time is preferably from 5 to 120 minutes, particularly preferably from 10 to 60 minutes.

The coating method may, for example, be an electrostatic coating method, an electrostatic spraying method, an electrostatic immersion method, a misting method, a fluidized bed coating method, a blowing method, a spraying method, a thermal spraying method, a plasma spraying method, etc. An electrostatic coating method using a powder coating gun is preferred, in that even when the molten film is thinned, surface smoothness of the molten film will be excellent and from such a viewpoint that the coating film will be excellent in hiding properties.

The powder coating gun may, for example, be a corona charging type spray gun or a friction charging type spray gun. The corona charging type spray gun is one to spray the powder coating material by corona discharge treatment. The friction charging type spray gun is one to spray the powder coating material by triboelectric charging treatment.

The amount of the powder coating material ejected from the powder coating gun is preferably from 50 to 200 g/min.

The distance from the tip of the gun portion of the powder coating gun to the substrate, is preferably from 150 to 400 mm from the viewpoint of coating efficiency.

In the case of using a corona charging type coating gun, the load voltage applied to components constituting the powder coating material by corona discharge treatment is preferably from −50 to −100 kV, and from the viewpoint of the deposition efficiency (percentage of the powder coating material depositing on the substrate) and excellent appearance of the coating film, it is preferably from −60 to −80 kV.

In the case of using a friction charging type spray gun, the internally generated current value of the powder coating material caused by triboelectric charging treatment is preferably from 1 to 8 µA, from the viewpoint of the deposition efficiency and excellent appearance of the coating film.

In the case of industrial implementation of the electrostatic coating method, for example, in order to set up a uncoated substrate thereon and to earth it, a grounded conductive horizontal belt conveyor is installed in a coating chamber, and the gun is set at an upper portion of the coating chamber. The coating pattern width is preferably from 50 to 500 mm, the traveling speed of the gun is preferably from 1 to 30 m/min, the conveyor speed is preferably from 1 to 50 m/min, and depending upon the particular purpose, suitable conditions may be selected from the above ranges.

As the coating method, a fluidized-bed coating method is preferred from such a viewpoint that a relatively thick coating can thereby be formed.

In the fluidized bed coating method, it is preferred that a substrate with its surface to be coated, heated to a temperature of at least the melting temperature of the powder coating material, is immersed in a fluidized bed in which the powder coating material is flowing as carried by a gas such as air, to let the powder coating material be deposited on the surface of the substrate to be coated and, at the same time, melted to form a molten film having a predetermined thickness on the substrate, and then, the coated substrate is taken out from the fluidized bed, whereupon, in some cases, the molten film is maintained in the molten state for a predetermined time, and then the molten state coating film is cooled and, in some cases, cured, to obtain the substrate having a coating film formed thereon.

The temperature in the fluidized bed in the fluidized bed coating method is preferably from 15 to 55° C., and the temperature of the gas such as air blown into the fluidized bed in order to fluidize the powder is also preferably from 15 to 55° C. The temperature of at least the surface to be coated, of the substrate at the time of being immersed in the fluidized bed, is preferably from 300 to 450° C., and the time allowed for the substrate to be immersed in the fluidized bed is preferably from 1 to 120 seconds.

The substrate taken out from the fluidized bed is preferably maintained at a temperature of from 150 to 250° C. for from 1 to 5 minutes.

<Step (f)>

The molten film in the molten state is cooled to room temperature (20 to 25° C.), and in some cases, cured to form a coating film.

Cooling after baking may be either quenching or annealing, but annealing is preferred in that the coating film will be thereby less likely to peel from the substrate.

The thickness of the coating film is not particularly limited and is preferably from 100 to 1,000 μm. In an application to a member for a high-rise building, such as an aluminum curtain wall, 20 to 90 μm is preferred. In an application where weather resistance is highly required, such as an outdoor unit of air conditioner installed along the coast, a traffic signal pole, a sign board, etc., 100 to 200 μm is preferred. Here, as mentioned above, in a case where the thickness is thick, such can be achieved by selecting the fluidized bed coating method.

EXAMPLES

Now, the present invention will be described in detail with reference to Examples. However, it should be understood that the present invention is by no means restricted thereto.

Ex. 1 to 3 are Examples of the present invention, Ex. 4 to 7 are Comparative Examples, and Ex. 8 and 9 are Reference Examples.

[Measuring Methods]
(Melting Point)

Using Thermal Analysis System (manufactured by Perkin Elmer), with respect to 10 mg of a sample, the heat balance was measured within a temperature range of from −25 to 200° C. at a temperature raising rate of 10° C./min, whereby the melting peak in the obtained chart was taken as the melting point.

(Molecular Weights)

With respect to a 0.5 mass % tetrahydrofuran (hereinafter referred to as THF) solution of a sample, the number average molecular weight (Mn) and the mass average molecular weight (Mw) as calculated as polystyrene were obtained by gel permeation chromatography (GPC) using TSKgel G4000XL (manufactured by Tosoh Corporation) as a column, at a flow rate of carrier (THF) being 1.0 mL/min.

(Composition of Acrylic Resin)

The composition of the acrylic resin was analyzed by 13C-NMR method. The analysis conditions were as follows.

Measurement apparatus: "ECP-400" manufactured by JEOL Ltd.

Measurement method: NOE decoupling method

Measurement solvent: deuterated DMF

Measurement temperature: 60° C.

(Crystallinity)

Using EXSTAR DSC7020 (manufactured by SII Nano Technology, Inc.), 10 mg of a sample was heated from room temperature to 200° C. at a temperature-raising rate of 10° C./min, and heat of fusion $M_1$ (J/g) was calculated from the area of endothermic peak in the obtained chart and the amount of the sample, whereupon the crystallinity of PVDF (A) was calculated by the following formula (1) from $M_1$ and heat of fusion $M_2$ of perfect crystal of PVDF (literature value: 104.5 J/g as disclosed in EXPRESS Polymer Letters, Vol. 4, No. 5, 2010, p. 284-291).

$$\text{Crystallinity (\%)} = (M_1/M_2) \times 100 \tag{1}$$

For the crystallinity during quenching, a sample was completely melted at 300° C. and then cooled from 300° C. to room temperature at a cooling rate of 10° C./min for re-crystallization, and using EXSTAR DSC7020 (manufactured by SII Nano Technology, Inc.), 10 mg of the re-crystallized sample was heated from room temperature to 200° C. at a temperature-raising rate of 10° C./min, and heat of fusion $M_1$ (J/g) was calculated from the area of endothermic peak in the obtained chart and the amount of the sample, whereupon the crystallinity during quenching was calculated by the formula (1) from $M_1$ and heat of fusion $M_2$ of perfect crystal of PVDF (literature value: 104.5 J/g as disclosed in EXPRESS Polymer Letters, Vol. 4, No. 5, 2010, p. 284-291).

The crystallinity during annealing was calculated in the same manner as the crystallinity during quenching, except that the cooling rate as a re-crystallization condition was changed to 0.5° C./min.

(Melt Viscosity)

The melt viscosity at 190° C. of a resin was measured by using a rotary rheometer (rheometer MCR302, manufactured by Anton Paar Japan K.K.) under a temperature-raising condition of 10° C./min.

(Glass Transition Temperature)

Using Thermal Analysis System (manufactured by Perkin Elmer), with respect to 10 mg of a sample, the heat balance was measured within a temperature range of from −25 to 200° C. at a temperature-raising rate of 10° C./min, and from the inflection point of the obtained chart, the glass transition temperature was obtained by a midpoint method.

(Average Particle Size)

The average particle size of a powder was measured by a laser diffraction particle size distribution analyzer (Helos-Rodos, manufactured by Sympatec Inc.) and determined by the 50% average volume particle size distribution.

[Evaluation Method]
(Pulverizability)

Pellets obtained in each Ex. were pulverized under the following conditions and the pulverizability was evaluated based on the following standards.

<Test Conditions>
Pulverizer: "High speed pin mill grinding machine Impact Mill AVIS-100" trade name, manufactured by DALTON CORPORATION
Temperature: room temperature
Number of revolutions: 20,000 revolutions per minute
<Evaluation Standards>
○ (Good): Pellets can be sufficiently pulverized.
X (Bad): Pellets cannot be pulverized.
(Appearance)
The state of the surface of the coating film was visually observed and judged by the following standards.
○ (Good): The coating film is excellent in surface smoothness, and surface roughness, repelling, wettability defect or the like is not observed.
X (Bad): The coating film is poor in surface smoothness, and surface roughness, repelling, wettability defect or the like is observed.
(Glossiness)
Using a gloss meter (PG-1M, manufactured by Nippon Denshoku Industries Co. Ltd.), the 60-degree specular glossiness of the surface of a coating film was measured in accordance with JIS K 5600-4-7, 1999 (ISO 2813, 1994).
(Adhesion)
In accordance with JIS K5600-5-6 (1999), the adhesion of the coating film to a substrate (aluminum plate) was evaluated based on the following standards.
○ (Good): Peeling of the coating film from the substrate is not confirmed.
X (Bad): Peeling of the coating film from the substrate is confirmed.
(Bending Processability)
In accordance with JIS K 5600-5-1, 1999 (ISO 1519, 1973), a bending test of a test piece was conducted, and the bending processability was evaluated under the following standards.
○ (Good): Rupture of the coating film or peeling of the coating film from the substrate is not observed.
X (Bad): Rupture of the coating film or peeling of the coating film from the substrate is observed.
(Weather Resistance)
A test piece was installed outdoor in Naha-city, Okinawa Prefecture, and the 60-degree specular glossiness of the surface of a coating film immediately before the installation and the 60-degree specular glossiness of the surface of the coating film after three years, were measured in accordance with JIS K 5600-4-7, 1999 (ISO 2813, 1994) by using a gloss meter (PG-1M, manufactured by Nippon Denshoku Industries Co. Ltd.). When the value of the 60-degree specular glossiness immediately before the test was taken as 100%, the proportion of the value of the 60-degree specular glossiness after three years was calculated as the gloss retention (unit: %), and the accelerated weather resistance was judged by the following standards.
<Judging Standards>
○ (Good): The gloss retention is at least 60%, and no discoloration is observed.
Δ (Acceptable): The gloss retention is at least 40% and less than 60%, and no discoloration is observed.
X (Bad): The gloss retention is less than 40%, or discoloration to yellow is observed.

Production Example 1

Production of Acrylic Resin (B-1)

Into a four-necked flask having a capacity of 300 mL equipped with a thermometer, a reflux condenser, a stirrer and a dropping funnel, 100 g of xylene was charged, and heated to 80° C. with stirring. Then, at 80° C., a mixture (component to be dropped) having 63.7 g of MMA, 36.3 g of EMA, 5 g of a peroxide-based polymerization initiator PERHEXYL manufactured by NOF CORPORATION and 25 g of xylene preliminarily uniformly mixed was dropwise added from the dropping funnel at a constant rate over a period of 2 hours. After completion of dropwise addition, the reaction mixture was held at 100° C. for 7 hours, and the reaction was completed. After completion of the reaction, xylene as the solvent was removed from the reaction product under reduced pressure to obtain acrylic resin (B-1). The obtained acrylic resin (B-1) had a composition comprising MMA units/EMA units=67/33 (molar ratio). The solid content concentration, the mass average molecular weight, the number average molecular weight, the glass transition temperature and the melt viscosity of acrylic resin (B-1) are shown in Table 1.

Production Example 2

Production of Acrylic Resin (B-2)

Acrylic resin (B-2) was obtained in the same manner as in Production Example 1 except that the amounts charged were changed to 86.4 g of MMA and 13.6 g of EMA. The obtained acrylic resin (B-2) had a composition comprising MMA units/EMA units=87/13 (molar ratio). The solid content concentration, the mass average molecular weight, the number average molecular weight, the glass transition temperature and the melt viscosity of acrylic resin (B-2) are shown in Table 1.

Production Example 3

Production of Acrylic Resin (Z-1)

Acrylic resin (Z-1) was obtained in the same manner as in Production Example 1 except that 58.0 g of methyl acrylate (hereinafter referred to also as MA) and 42.0 g of butyl methacrylate were charged. The solid content concentration, the mass average molecular weight, the number average molecular weight, the glass transition temperature and the melt viscosity of acrylic resin (Z-1) are shown in Table 1.

Production Example 4

Production of Acrylic Resin (Z-2)

Acrylic resin (Z-2) was obtained in the same manner as in Production Example 1 except that the amount charged was changed to 100 g of MMA. The solid content concentration, the mass average molecular weight, the number average molecular weight, the glass transition temperature and the melt viscosity of acrylic resin (Z-2) are shown in Table 1.

Production Example 5

Production of Acrylic Resin (X-1)

Acrylic resin (X-1) having a solid content concentration of 99.5 mass %, Mw of 70,000 and Mn of 39,000 was obtained in the same manner as in Production Example 5 except that the amounts charged were changed to 94.3 g of MMA and 5.7 g of EMA. The obtained acrylic resin (X-1) had a composition comprising MMA units/EMA units=95/5 (molar ratio). Further, acrylic resin (X-1) had a glass transition temperature of 102.5° C. and a melt viscosity at 190° C. of 730.5 Pa·s.

Production Example 6

Production of Acrylic Resin (X-2)

Acrylic resin (X-2) having a solid content concentration of 99.5 mass %, Mw of 70,000 and Mn of 44,000 was obtained in the same manner as in Production Example 5 except that 63.7 g of MA was used instead of MMA and 36.3 g of stearyl methacrylate was used instead of EMA. The obtained acrylic resin (X-2) had a composition comprising MA units/stearyl methacrylate units=87/13 (molar ratio). Further, acrylic resin (X-2) had a glass transition temperature of 18.2° C., and a melt viscosity at 190° C. of 5.5 Pa·s.

TABLE 1

| Production Example | 1 | 2 | 3 | 4 | 5 | 6 |
|---|---|---|---|---|---|---|
| Solid content concentration [mass %] | 99.5 | 99.5 | 99.5 | 99.5 | 99.5 | 99.5 |
| Mass average molecular weight | 78,000 | 90,000 | 72,000 | 82,000 | 70,000 | 70,000 |
| Number average molecular weight | 45,000 | 43,000 | 41,000 | 43,000 | 39,000 | 44,000 |
| Melt viscosity at 190° C. [Pa·s] | 314.7 | 492.3 | 9.1 | 1,500 | 730.5 | 5.5 |
| Glass transition temperature [° C.] | 55 | 70 | 12.9 | 105 | 102.5 | 18.2 |
| Type of acrylic resin | B-1 | B-2 | Z-1 | Z-2 | X-1 | X-2 |
| Proportion (MMA/EMA) | 67/33 | 87/13 | — | — | 95/5 | — |

[Respective Components Used for Preparing Powder Coating Composition]

A-1: Commercially available PVDF (A) "PVDF DS203" (trade name), manufactured by SHENZHOU NEWMATERIAL CO., Ltd., mass average molecular weight (Mw): 270,000, number average molecular weight (Mn): 160,000, melting point: 170.0° C., crystallinity: 22.5%, crystallinity (during quenching): 19.7%, crystallinity (during annealing): 21.8%, difference in crystallinity (during annealing—during quenching!): 2.1%, melt viscosity at 190° C.: 3,100 Pa·s.

D-1: Titanium oxide pigment (Ti-Pure (trade name) R960, manufactured by DuPont, titanium oxide content: 89 mass %).

D-2: An organic ultraviolet absorber (Tinuvin (trade name) 405, manufactured by BASF, molecular weight: 583.8, melting point: 76.3° C., volatilization temperature: 348.5° C.).

D-3: A degassing agent (benzoin).

D-4: A leveling agent for powder coating material (BYK (trade name)—360P, manufactured by BYK-Chemie Inc.).

Ex. 1 to 7

The components shown in Table 2 were mixed for about 10 to 30 minutes by using a high speed mixer (manufactured by Yusaki Co., Ltd.), to obtain a powdered mixture. Using a twin screw extruder (16 mm extruder, manufactured by Thermo Prism Ltd.), the mixture was subjected to melt-kneading at a barrel set temperature of 120° C., to obtain pellets made of a composition for powder coating material. The pellets were pulverized at room temperature using a pulverizer (rotor speed mill P14, manufactured by FRITSCH), followed by classification by 200 mesh, to obtain a powder having an average particle size of about 20 μm. The pulverizability on that occasion is shown in Table 2.

In Ex. 4 and 7, the pellets were sticky and could not be pulverized, and no powder coating material could be produced. In Ex. 5, melt-kneading was carried out at a barrel set temperature of 170° C. to obtain pellets.

Using the obtained powder as a powder coating material, on one surface of an aluminum plate subjected to chromate treatment, electrostatic coating was applied by an electrostatic coating machine (GX3600C, manufactured by Onoda Cement Corporation), followed by holding for 10 minutes in an 250° C. atmosphere. The coated product was left to cool to room temperature to obtain an aluminum plate having a coating film with a thickness of from 25 to 45 μm attached (hereinafter referred to also as an aluminum plate with a coating film). Using the obtained aluminum plate with a coating film as a test piece, evaluations were conducted. The results are shown in Table 2.

TABLE 2

| | | | Ex. 1 | Ex. 2 | Ex. 3 | Ex. 4 | Ex. 5 | Ex. 6 | Ex. 7 |
|---|---|---|---|---|---|---|---|---|---|
| Amount used (g) | PVDF | A-1 | 70 | 70 | 20 | 70 | 70 | 70 | 70 |
| | Acrylic resin | B-1 | 30 | — | 80 | — | — | — | — |
| | | B-2 | — | 30 | — | — | — | — | — |
| | | Z-1 | — | — | — | 30 | — | — | — |
| | | Z-2 | — | — | — | — | 30 | — | — |
| | | X-1 | — | — | — | — | — | 30 | — |
| | | X-2 | — | — | — | — | — | — | 30 |
| | Additives | D-1 | 40 | 40 | 40 | 40 | 40 | 40 | 40 |
| | | D-2 | 0.1 | 0.1 | 0.1 | 0.1 | 0.1 | 0.1 | 0.1 |
| | | D-3 | 0.4 | 0.4 | 0.4 | 0.4 | 0.4 | 0.4 | 0.4 |
| | | D-4 | 0.1 | 0.1 | 0.1 | 0.1 | 0.1 | 0.1 | 0.1 |

TABLE 2-continued

| | | Ex. | | | | | | |
|---|---|---|---|---|---|---|---|---|
| | | 1 | 2 | 3 | 4 | 5 | 6 | 7 |
| Evaluations | Pulverizability | ○ | ○ | ○ | X | X | X | X |
| | Appearance | ○ | ○ | ○ | — | X | ○ | — |
| | Glossiness | 34 | 35 | 41 | — | 27 | 38 | — |
| | Adhesion | ○ | ○ | ○ | — | X | X | — |
| | Bending processability | ○ | ○ | ○ | — | X | X | — |
| | Weather resistance | ○ | ○ | X | — | X | ○ | — |

As shown in Table 2, in Ex. 1 to 3 in which PVDF (A-1) having a melting point within a range of from 151 to 200° C. and acrylic resin (B-1) or (B-2) having a glass transition temperature within a range of from 40 to 90° C. were used, the composition could be sufficiently pulverized to obtain a powder coating material, and the obtained coating film was excellent in weather resistance and adhesion under normal conditions. Further, the coating film was excellent also in appearance, glossiness and bending processability. In Ex. 1 and 2 in which the content of PVDF (A-1) was within a range of from 30 to 95 parts by mass in the total of 100 parts by mass of PVDF (A) and the acrylic resin (B), the obtained coating film was excellent in weather resistance even under severe conditions.

Whereas in Ex. 4 in which acrylic resin (Z-1) having a glass transition temperature of less than 40° C. was used, pellets were sticky and could not be pulverized, and no powder coating material could be produced.

In Ex. 5 in which acrylic resin (Z-2) having a glass transition temperature higher than 90° C. was used, the obtained coating film was insufficient in all of adhesion, weather resistance, appearance, glossiness and bending processability.

Further, in Ex. 1 to 3 in which the acrylic resin (B-1) or (B-2) comprising MMA units and EMA units in a proportion (MMA units/EMA units) of from 50/50 to 90/10 (molar ratio) and having a glass transition temperature within a range of from 40 to 90 ° C. was used, the molten film was excellent in wettability and thus the coating film was excellent in adhesion to the substrate.

Whereas in Ex. 6 in which acrylic resin (X-1) having a proportion (MMA units/EMA units) being out of the range of from 50/50 to 90/10 (molar ratio) and having a glass transition temperature of higher than 90° C. was used, the molten film was insufficient in wettability and thus the obtained coating film was insufficient in adhesion to the substrate. Further, corrosion was confirmed on the aluminum plate as the substrate. In Ex. 7 in which acrylic resin (X-2) obtained by copolymerizing monomers other than MMA and EMA, having a glass transition temperature of less than 40° C., was used, no powder coating material could be produced.

Ex. 8

An aluminum plate with a coating film was obtained in the same manner as in Ex. 1 except that using, instead of the aluminum plate subjected to chromate treatment, an aluminum plate treated with a chemical conversion treatment agent containing no chromium(VI), manufactured by Henkel (trade name: "Alodine 5200"), an epoxy resin manufactured by Pelnox Ltd. (trade name: "Pel Powder PCE-900") was electrostatically coated as a primer in a thickness of 30 μm, and then, the powder coating material obtained in Ex. 1 was electrostatically coated.

Ex. 9

An aluminum plate with a coating film was obtained in the same manner as in Ex. 8 except that no epoxy resin powder coating material manufactured by Pelnox Ltd. was used as a primer.

Using the aluminum plate with a coating film obtained in each of Ex. 1, Ex. 8 and Ex. 9, as a test piece, evaluations of corrosion resistance and weather resistance were conducted. The results are shown in Table 3.

<Corrosion Resistance (Neutral Salt Spray Resistance)>

In accordance with JIS K 5600-7-1 (1999), corrosion resistance of the aluminum plate was evaluated by the following standards.

○ (Good): At a cross-cut portion of the coating film, occurrence of swelling of the coating film or white rust of aluminum is not observed.

X (Bad): At a cross-cut portion of the coating film, occurrence of swelling of the coating film or white rust of aluminum is observed.

TABLE 3

| | Ex. 1 | Ex. 8 | Ex. 9 |
|---|---|---|---|
| Corrosion resistance | ○ | ○ | X |
| Weather resistance | ○ | ○ | X |

In Table 3, it was confirmed that even though the aluminum plate in Ex. 8 was one treated with a chemical conversion treatment agent containing no chromium, as it was provided with a primer layer, it was excellent in corrosion resistance similar to the aluminum plate subjected to chromate chemical conversion treatment in Ex. 1. On the other hand, it was confirmed that in Ex. 9 having no primer layer, even an aluminum plate subjected to chromium-free chemical conversion treatment was insufficient in corrosion resistance against e.g. swelling of the cross-cut portion or rust.

INDUSTRIAL APPLICABILITY

The powder coating material of the present invention is useful for forming a coating film on e.g. a signal machine, a telephone pole, a road sign pole, a bridge, a railing, a building material (gate, fence, siding material for a house, a curtain wall, a roof, etc.), a car body or parts (bumper, wiper blade, etc.), a household appliance (outdoor unit of air conditioner, water heater exterior, etc.), blades for wind power generator, a solar cell back sheet, a back surface of a heat collection mirror for solar power generator, a surface of eggplant battery exterior, etc.

This application is a continuation of PCT Application No. PCT/JP2015/068707, filed on Jun. 29, 2015, which is based upon and claims the benefit of priorities from Japanese Patent Application No. 2014-136303 filed on Jul. 1, 2014 and Japanese Patent Application No. 2014-136304 filed on Jul. 1, 2014. The contents of those applications are incorporated herein by reference in their entireties.

What is claimed is:

1. A composition, comprising the following polyvinylidene fluoride (A) and the following acrylic resin (B):
   polyvinylidene fluoride (A): a polyvinylidene fluoride having a melting point of from 151 to 200° C.;
   acrylic resin (B): an acrylic resin having a glass transition temperature of from 40 to 80° C., wherein the acrylic resin (B) comprises units derived from methyl methacrylate and units derived from ethyl methacrylate,
   wherein the difference between the melting point of the polyvinylidene fluoride (A) and the glass transition temperature of the acrylic resin (B) is from 70 to 140° C., and
   wherein the proportion of the units derived from methyl methacrylate to the units derived from ethyl methacrylate [(methyl methacrylate units)/(ethyl methacrylate units)] is from 50/50 to 90/10 (molar ratio).

2. The composition according to claim 1, wherein the difference between the melting point of the polyvinylidene fluoride (A) and the glass transition temperature of the acrylic resin (B) is from 100 to 140° C.

3. The composition according to claim 1, wherein the content of the polyvinylidene fluoride (A) is from 30 to 95 parts by mass in the total of 100 parts by mass of the polyvinylidene fluoride (A) and the acrylic resin (B).

4. A powder coating material comprising a powder comprising the composition according to claim 1.

5. A coated article having a coating film comprising the powder coating material according to claim 4, on the surface of a substrate.

6. The coated article according to claim 5, wherein the material for the substrate is aluminum or aluminum alloy surface-treated with a chemical conversion treatment agent.

7. The coated article according to claim 6, wherein the chemical conversion treatment agent is a zirconium-containing treatment agent or a titanium-containing treatment agent, which does not contain chromium.

8. The coated article according to claim 5, which further comprises, between the surface of the substrate and the coating film comprising the powder coating material, a primer layer composed of at least one primer selected from the group consisting of an acrylic resin, a polyester resin and an epoxy resin.

9. A powder coating material comprising a first powder comprising the composition according to claim 1, and
   a second powder comprising a composition which comprises at least one resin (C) selected from the group consisting of an acrylic resin, a polyester resin, an urethane resin, an epoxy resin and a silicone resin and which contains no fluororesin.

10. The powder coating material according to claim 9, wherein the mixing ratio of the first powder to the second powder ((the first powder)/(the second powder)) is from 10/90 to 90/10 (mass ratio).

11. The composition according to claim 1, wherein the acrylic resin (B) is a polymer consisting of units derived from methyl methacrylate and units derived from ethyl methacrylate.

12. The composition according to claim 1, wherein the acrylic resin (B) has a number average molecular weight (Mn) of from 20,000 to 100,000.

13. The composition according to claim 1, wherein the acrylic resin (B) has a mass average molecular weight (Mw) of from 30,000 to 200,000.

14. The composition according to claim 1, wherein the acrylic resin (B) has a melt viscosity of from 50 to 500 Pa·s at a kneading temperature of 190° C.

15. The composition according to claim 1, wherein the proportion of the units derived from methyl methacrylate to the units derived from ethyl methacrylate [(methyl methacrylate units)/(ethyl methacrylate units)] is from 67/33 to 87/13 (molar ratio).

* * * * *